US012713243B2

(12) United States Patent
Reeves et al.

(10) Patent No.: US 12,713,243 B2
(45) Date of Patent: Aug. 18, 2026

(54) SYSTEM FOR DETECTING ACTIVITY RELATED TO DECOMMISSIONED NETWORK DEVICES

(71) Applicant: T-Mobile USA, Inc., Bellevue, WA (US)

(72) Inventors: Raymond E. Reeves, Orlando, FL (US); Simon Youngs, Overland Park, KS (US)

(73) Assignee: T-Mobile USA, Inc., Bellevue, WA (US)

(*) Notice: Subject to any disclaimer, the term of this patent is extended or adjusted under 35 U.S.C. 154(b) by 293 days.

(21) Appl. No.: 18/653,850

(22) Filed: May 2, 2024

(65) Prior Publication Data

US 2025/0344067 A1 Nov. 6, 2025

(51) Int. Cl.

*H04W 12/122* (2021.01)
*H04L 41/046* (2022.01)
*H04W 16/18* (2009.01)

(52) U.S. Cl.

CPC ......... *H04W 12/122* (2021.01); *H04L 41/046* (2013.01); *H04W 16/18* (2013.01)

(58) Field of Classification Search

CPC .. H04W 12/122; H04W 16/18; H04L 41/046; H04L 63/1433

See application file for complete search history.

(56) References Cited

U.S. PATENT DOCUMENTS 6,470,386 B1 10/2002 Combar et al.
8,073,123 B2 12/2011 Mamakos
8,165,109 B2 4/2012 King et al.
8,365,162 B2 1/2013 Rauma
8,737,989 B2 5/2014 Luft
8,781,454 B2 7/2014 Li et al.
9,917,754 B2 3/2018 Childress et al.
10,129,799 B2 11/2018 Viswanathan et al.
10,693,954 B2 6/2020 Kozloski et al.

(Continued)

FOREIGN PATENT DOCUMENTS

CN 113396601 B 9/2022
DE 19932223 A1 1/2000

(Continued)

*Primary Examiner* — Mazda Sabouri

(74) *Attorney, Agent, or Firm* — Perkins Coie LLP

(57) ABSTRACT

The system determines a list of active telecommunication network devices at a location and measures a standard activity level for each active telecommunication network device at the location. The system generates a profile for each active telecommunication network device at the location and records the data of each profile on a blockchain. The system monitors a network for deviations from the standard activity level and detects unexpected activity at the location. The system compares the unexpected activity to the standard activity level recorded on the blockchain and determines the source of the unexpected activity based on the source's Internet Protocol address and the comparison of the unexpected activity level to the standard activity level. The system determines a list of security vulnerabilities caused by the decommissioned telecommunication network device being active on the network and executes a predetermined decommissioning procedure on the source of the unexpected activity.

20 Claims, 5 Drawing Sheets

(56) References Cited

U.S. PATENT DOCUMENTS

| | | | |
|---|---|---|---|
| 11,272,366 B2 | 3/2022 | Chennupati et al. | |
| 11,277,318 B2 | 3/2022 | Tiwari et al. | |
| 11,349,861 B1 | 5/2022 | Costlow et al. | |
| 11,533,624 B2 | 12/2022 | Shaw et al. | |
| 11,570,793 B2 | 1/2023 | Shaw | |
| 11,743,724 B2 | 8/2023 | Chennupati et al. | |
| 11,799,878 B2 | 10/2023 | Shaw et al. | |
| 11,843,950 B2 | 12/2023 | Obaidi | |
| 2004/0003070 A1 | 1/2004 | Fernald et al. | |
| 2010/0159871 A1 | 6/2010 | Tester | |
| 2010/0309895 A1 | 12/2010 | Hunn et al. | |
| 2013/0005363 A1 | 1/2013 | Tester | |
| 2019/0319971 A1* | 10/2019 | Levy | G06F 21/45 |
| 2020/0112563 A1* | 4/2020 | Ree | H04L 9/3247 |
| 2021/0329011 A1* | 10/2021 | Shaw | H04L 63/1416 |
| 2021/0329032 A1* | 10/2021 | Shaw | H04L 63/1425 |
| 2022/0021693 A1* | 1/2022 | Summers | G06F 1/14 |
| 2022/0407881 A1 | 12/2022 | Costlow et al. | |
| 2023/0208870 A1 | 6/2023 | Yellapragada et al. | |
| 2024/0064503 A1 | 2/2024 | Sihotang et al. | |

FOREIGN PATENT DOCUMENTS

| | | |
|---|---|---|
| EP | 1358756 A2 | 11/2003 |
| EP | 1838053 A1 | 9/2007 |
| EP | 2116012 A1 | 11/2009 |
| EP | 2377289 A1 | 10/2011 |
| EP | 2780807 A2 | 9/2014 |
| EP | 1999907 B1 | 2/2016 |
| EP | 1982543 B1 | 6/2017 |
| JP | 2009531915 A | 9/2009 |
| JP | 2010531553 A | 9/2010 |
| JP | 5740672 B2 | 5/2015 |
| JP | 5882996 B2 | 2/2016 |
| JP | 6455780 B2 | 12/2018 |
| JP | 6563505 B2 | 8/2019 |
| KR | 101907812 B1 | 10/2018 |
| KR | 102035480 B1 | 10/2019 |
| WO | 0145352 A2 | 6/2001 |
| WO | 2005122491 A1 | 12/2005 |
| WO | 2007091934 A1 | 8/2007 |
| WO | 2007110584 A1 | 10/2007 |
| WO | 2008088425 A1 | 7/2008 |
| WO | 2009030955 A2 | 3/2009 |
| WO | 2010075233 A1 | 7/2010 |
| WO | 2013062703 A1 | 5/2013 |
| WO | 2018150390 A1 | 8/2018 |
| WO | 2019125096 A1 | 6/2019 |
| WO | 2020210015 A1 | 10/2020 |

* cited by examiner

SYSTEM FOR DETECTING ACTIVITY RELATED TO DECOMMISSIONED NETWORK DEVICES

BACKGROUND

Decommissioning a system is a critical process that involves removing a system from service, securing its data, and disposing of its hardware and software. It requires careful planning, coordination, and execution to avoid any negative impacts on the business, security, and compliance. Managing a data decommissioning policy is a systematic approach to managing the series of steps through which IT assets must go at end-of-life. These policies allow companies to prove that they are compliant with auditors and that they keep their clients' privacy a top priority. Not only do decommissioning policies improve consistency and productivity throughout the company, but with the explosion of cloud-based data, adoption of such a methodology has become imperative.

BRIEF DESCRIPTION OF THE DRAWINGS

Detailed descriptions of implementations of the present invention will be described and explained through the use of the accompanying drawings.

Figure 1:
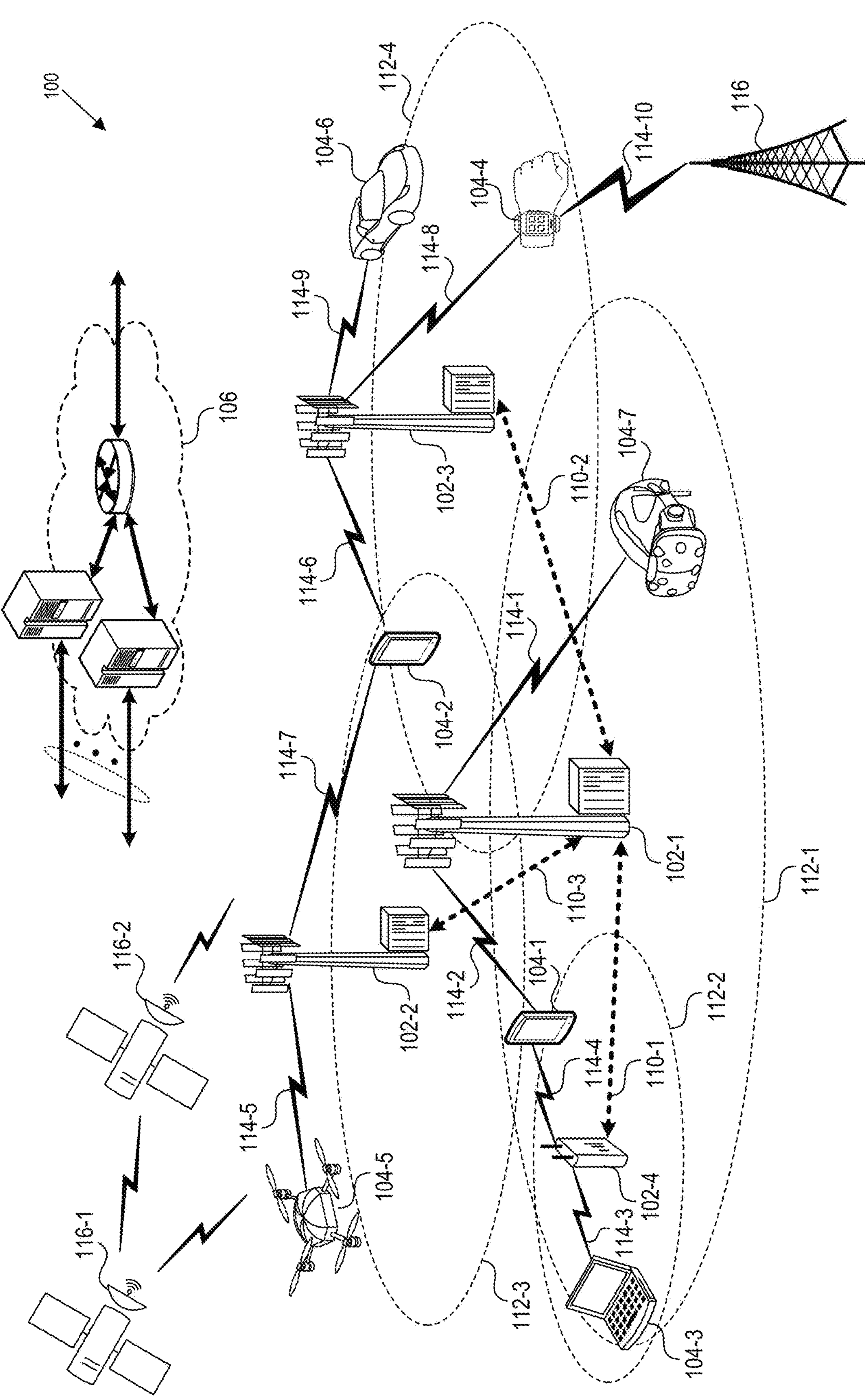
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system for detecting and decommissioning telecommunication network devices. A telecommunication network device can be any network hardware or a device connected to the network, such as a server, router, or switch. For instance, a category of telecommunication network devices can be those devices used to provide service to or maintain the network. The status of a telecommunication network device can be either active, inactive, or decommissioned. For example, active telecommunication network devices are expected to be connected to the network and have an expected and measurable standard activity level. In contrast, inactive telecommunication network devices are connected to the network but do not have an expected or measurable activity level. Decommissioned telecommunication network devices are expected to be disconnected from the network and have no activity level. Decommissioning a device can prevent vulnerabilities in the network that hackers or harmful entities can use to compromise the network and/or steal confidential data. The system can determine a list of active telecommunication network devices. For example, the list can include all active telecommunication network devices for a single location or multiple locations.

The system uses a software agent to measure a standard activity level for each active telecommunication network device. The standard activity level can include a network traffic amount, a network traffic type, or a power consumption amount. In one implementation, the network traffic amount and network traffic type are determined based on the telecommunication network device's Internet Protocol (IP) address. For instance, a software agent is a piece of software that functions as an agent for a user or another program, working autonomously and continuously in a particular environment to perform a predetermined task. In one implementation, the software agent can communicate with a central manager that can verify and challenge an object reported as suspicious when the object was determined to have interacted with a telecommunication network device. In one example, the software agent is positioned between two nodes of the network and is hidden from the telecommunication network devices connected to the network. For example, hidden means the software agent is running in the background of the system, making any user or entity on the system unaware of the software agent's existence. For example, due to the software agent being hidden, the agent would be undetectable by a malicious entity trying to gain access to the network through the use of a decommissioned telecommunication network device.

The system can generate a profile for each active telecommunication network device. In one implementation, the profile can be unique to each active telecommunication network device and can include the standard activity level for the active telecommunication network device. In another implementation, the profile is unique for a given location where there is a single profile generated for a predetermined geographic area. The profile can include the standard activity level over a predetermined period of time, such as a minute, an hour, a day, a week, or a month. In one example, the system can record the profile on the blockchain. Recording the profile on the blockchain can increase the integrity of the record and prevent a third party from modifying the profile without prior authorization from the entity in control of the profile. In one implementation, the blockchain is updated when an update to the profile occurs. In another implementation, the blockchain is updated periodically, such as every minute, hour, day, week, or month. For example, the blockchain can be updated by adding a new block to the blockchain, where the new block includes data relating to the update to the profile.

The system monitors the network for deviations from the standard activity level caused by unexpected activity on the network. Using a network traffic object profiler, the system detects the unexpected activity at a location containing a telecommunication network device. For example, the unexpected activity can include an unexpected network traffic amount, an unexpected network traffic type, or an unexpected power consumption amount. For example, a deviation can occur when activity not recorded on the blockchain is detected. A network traffic object profiler can detect malicious traffic patterns that might otherwise be misclassified as harmless activity.

The system compares the unexpected activity to the standard activity level recorded on the blockchain. When the unexpected activity does not have a counterpart activity measurement recorded on the blockchain, the system determines the source of the unexpected activity. The system can determine the source based on the source's IP address and the comparison of the unexpected activity to the standard activity level. In one implementation, the system can receive a list of decommissioned telecommunication network devices and can use the list to determine the source of the unexpected activity. The list can include the decommissioning procedure applied to each decommissioned telecommunication network device, the decommissioning date, the date of the last security update applied to the decommissioned telecommunication network device, and/or the IP address of each decommissioned telecommunication network device. For example, the list of decommissioned telecommunication network devices can include all devices that had access to the network during a predetermined time period.

When the system determines that the source of the unexpected network activity is a telecommunication network device designated as decommissioned, the system can determine a list of security vulnerabilities caused by the decommissioned telecommunication network device having an active status. For example, a telecommunication network device can be active but marked as decommissioned when the decommissioning process has not yet occurred. This can occur when an employee in charge of the decommissioning process leaves a company before the telecommunication network device is decommissioned. Additionally, this can occur when a telecommunication network device is incorrectly marked as decommissioned before the decommissioning procedure has begun and/or finished, which can cause the telecommunication network device to remain active but not receive needed security updates and/or maintenance. Based on the severity of the security vulnerabilities, the system can quarantine the telecommunication network device and/or execute a decommissioning procedure to ensure that the device receives a decommissioned status and cannot regain an active status.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
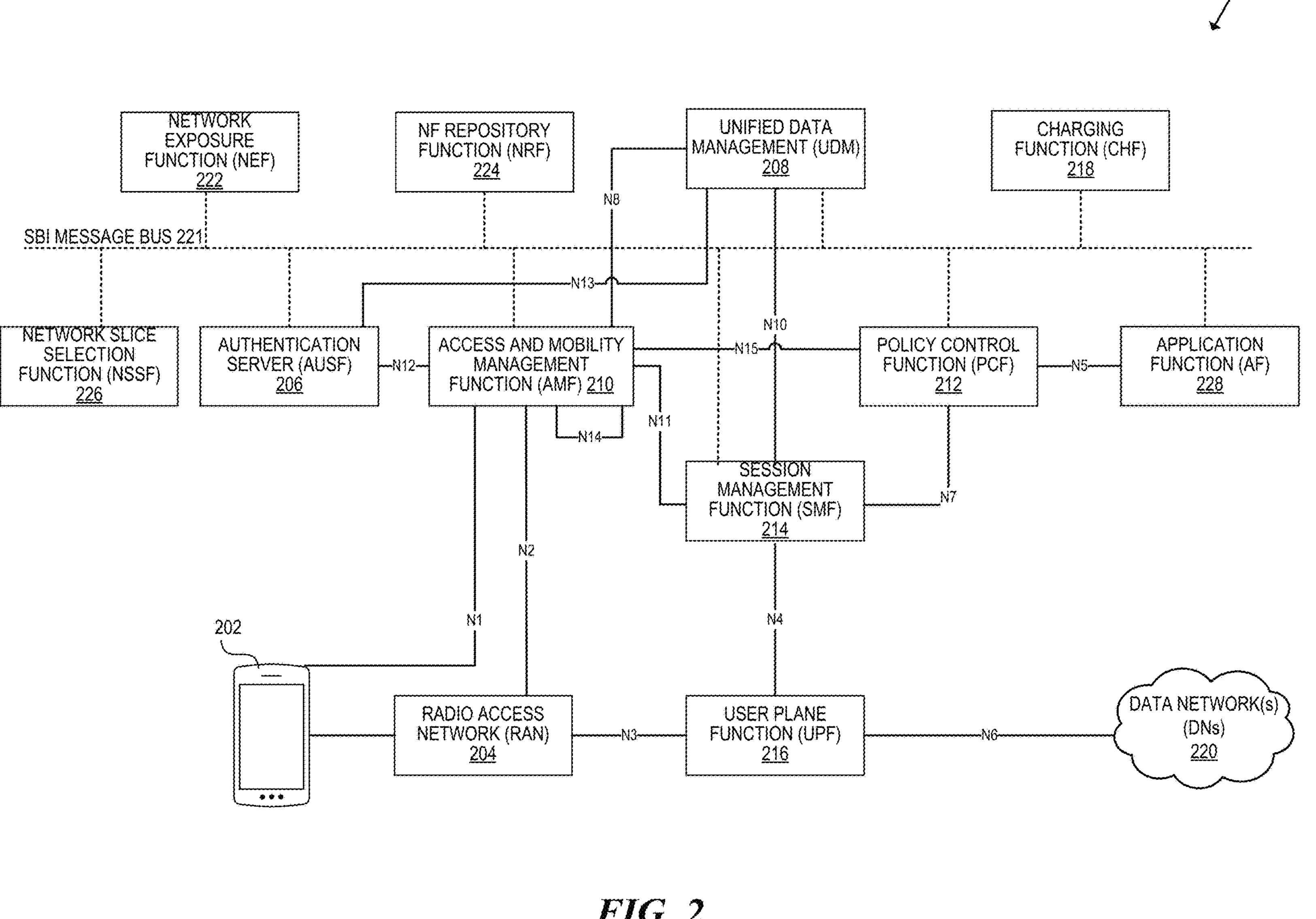
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Decommissioned Device Detection Tool

Figure 3:
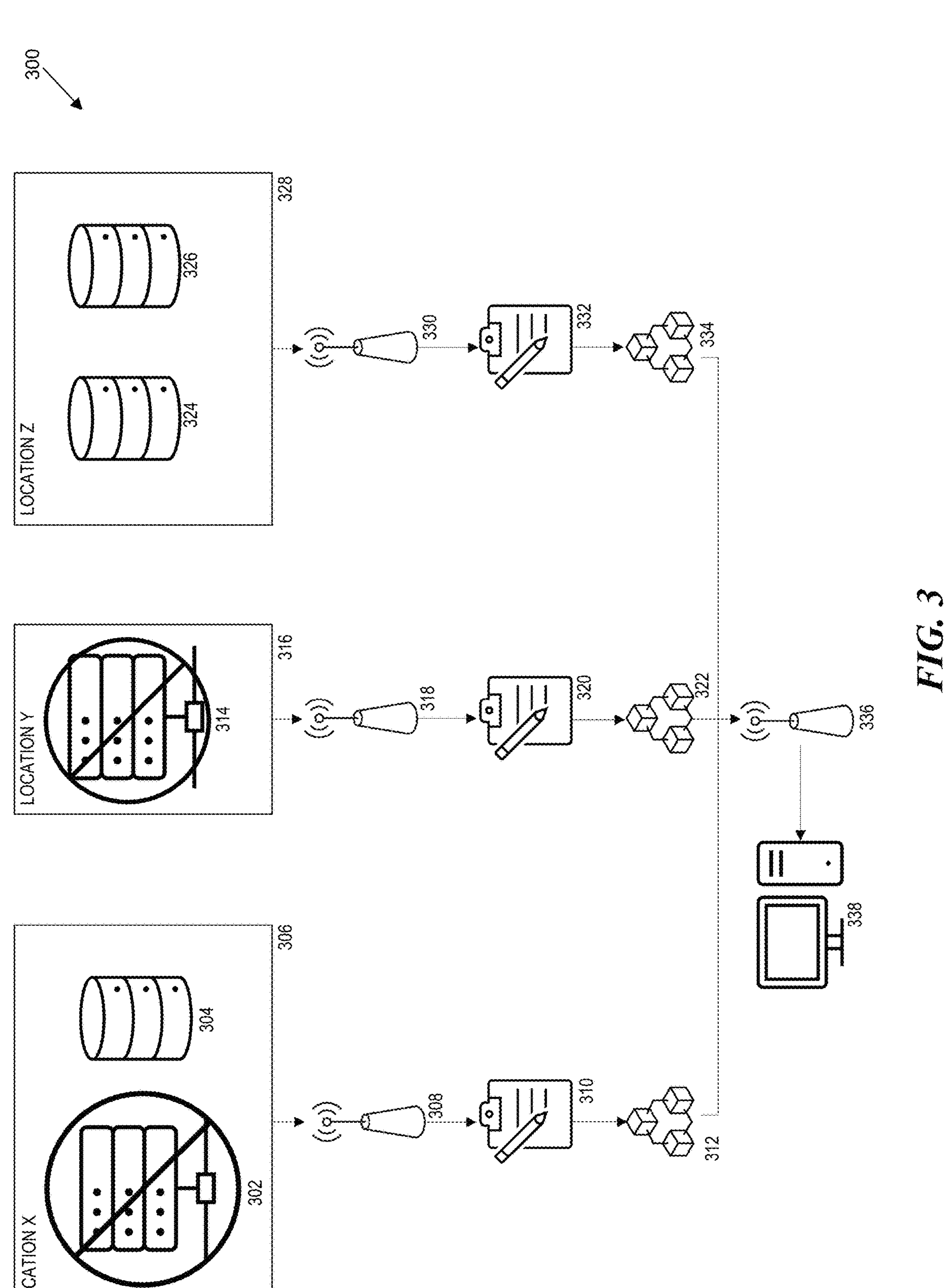
FIG. 3 is a block diagram that illustrates an embodiment of the system.

FIG. 3 is a block diagram that illustrates an embodiment 300 of the system for detecting decommissioned telecommunication network devices at multiple locations. The system can monitor location X 306, location Y 316, and location Z 328. Each location can contain different telecommunication network devices. Each location can also have a different combination of active, inactive, or decommissioned telecommunication network devices.

Location X 306 can contain multiple telecommunication network devices: device 302, which has a decommissioned status, and device 304, which has an active status. Network node 308 can receive and transmit network activity generated by device 302 and device 304. Software agent 310 can monitor the network activity level to generate a standard activity level for location X 306. Software agent 310 can record the standard activity level on blockchain 312. Blockchain 312 can include the standard activity level generated by all active telecommunication network devices at location X 306. The standard activity level recorded on blockchain 312 can be transmitted to network node 336, where it is received by monitoring hub 338. Monitoring hub 338 can control all software agents on the network and monitor the activity level for each location.

Monitoring hub 338 can detect and determine changes to the standard activity level. For example, an increased standard activity level can indicate unauthorized use of a telecommunication network device. Unauthorized use can be caused by an attacker activating an inactive telecommunication network device thought to be decommissioned. Unexpected activity can be detected by monitoring hub 338 at location X 306 when device 302 generates network activity. Monitoring hub 338 can determine that the activity is unexpected by comparing the detected activity level to the standard activity level recorded on blockchain 312. The activity is considered unexpected when the activity is not found on the most recent version of blockchain 312. For example, monitoring hub 338 can determine the source of the unexpected activity by determining the IP address of the source of the activity level and comparing the IP address to the IP addresses of all active, inactive, and decommissioned telecommunication network devices.

Monitoring hub 338 determines that the source is decommissioned device 302, meaning device 302 had an inactive status instead of the decommissioned status as expected. Device 302 was detected to be active when the unexpected activity was detected. Monitoring hub 338 can compare the unexpected activity type and level to past standard activity levels on blockchain 312 when device 302 had an active status. Comparing the unexpected activity level to the past standard activity level allows the system to determine whether the unexpected activity level is of the type and level expected from device 302. Monitoring hub 338 can begin a decommissioning procedure for device 302. The decommissioning procedure can cause device 302 to be appropriately decommissioned to ensure that device 302 does not generate unexpected activity again. Performing the decommissioning procedure can cause the unexpected activity to end at location X 306.

Location Y 316 can include only telecommunication network equipment with a decommissioned status, such as device 314. Network node 318 can receive and transmit network activity generated by device 314. Because location Y 316 includes only device 314, which has a decommissioned status, no activity is generated at location Y 316. Software agent 320 can monitor the network activity level to generate a standard activity level for location Y 316. Software agent 320 can record the standard activity level on blockchain 322. Blockchain 322 can include the standard activity level generated by all active telecommunication network devices at location Y 316, meaning that the standard activity level is zero because there are no active telecommunication network devices. The standard activity level recorded on blockchain 322 can be transmitted to network node 336, where it is received by monitoring hub 338.

Monitoring hub 338 can detect unexpected activity on the network coming from location Y 316. Monitoring hub 338 can determine that the activity is unexpected by comparing the detected activity level to the standard activity level recorded on blockchain 322. The activity is considered unexpected when the activity is not found on the most recent version of blockchain 322. By analyzing the IP address of the unexpected activity, monitoring hub 338 can determine that the unexpected activity is coming from device 314.

Monitoring hub 338 determines that the source is decommissioned device 314, meaning device 314 had an inactive status until the unexpected activity was detected. Device 314 was, therefore, not appropriately decommissioned as expected. Monitoring hub 338 can compare the unexpected activity type and level to past standard activity levels on blockchain 322 when device 314 had an active status. Comparing the unexpected activity level to the past standard activity level allows the system to determine whether the unexpected activity level is of the type and level expected from device 314. Monitoring hub 338 can begin a decommissioning procedure for device 314. The decommissioning procedure can cause device 314 to be appropriately decommissioned to ensure that device 314 does not generate unexpected activity again. Performing the decommissioning procedure can cause the unexpected activity to end at location Y 316.

Location Z 328 can include only active telecommunication network devices, such as device 324 and device 326. Network node 330 can receive and transmit network activity requests generated by device 324 and device 326. Software agent 332 can monitor the network activity level to generate a standard activity level for location Z 328. Software agent 332 can record the standard activity level on blockchain 334. Blockchain 334 can include the standard activity level of all active telecommunication network devices at location Z 328. The standard activity level recorded on blockchain 334 can be transmitted to network node 336, where it is received by monitoring hub 338. Monitoring hub 338 can monitor the activity at location Z 328. Because location Z 328 has no decommissioned telecommunication network devices, monitoring hub 338 will not determine that unexpected activity at location Z 328 was generated from a decommissioned telecommunication network device.

Figure 4:
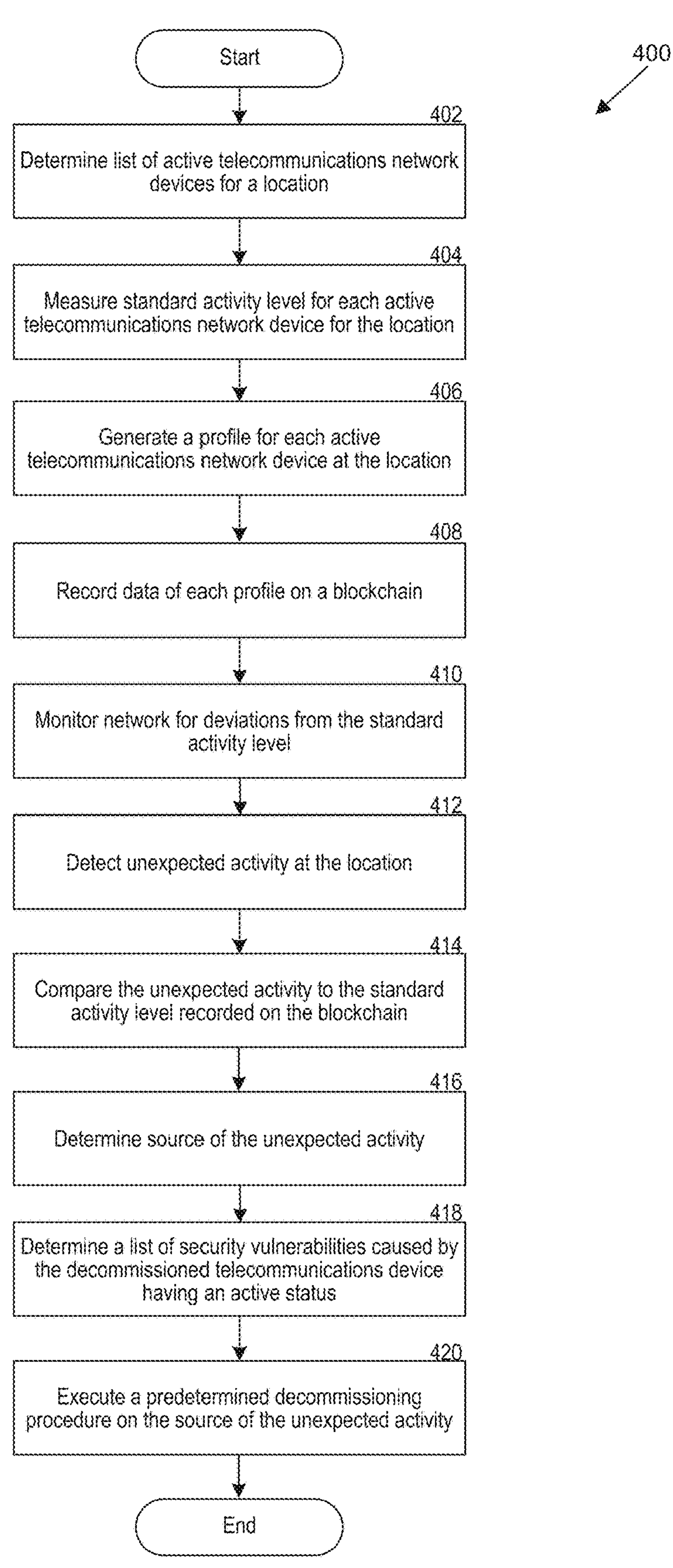
FIG. 4 is a flowchart that illustrates the process of detecting decommissioned telecommunication network devices on a network.

FIG. 4 is a flowchart that illustrates process 400 performed by a tool detecting decommissioned telecommunication network devices with an active status on the network. In one example, the tool can be embodied in a computer system, the system including at least one hardware processor and at least one non-transitory memory storing instructions, which, when executed by the at least one hardware processor, cause the system to perform the process 400.

At 402, the system can determine a list of active telecommunication network devices at a location. In one example, a status for a telecommunication network device can be active or decommissioned. At 404, the system can measure, using a software agent, a standard activity level for each active telecommunication network device at the location. In one example, the standard activity level includes a network traffic amount, a network traffic type, or a power consumption amount. In another example, the software agent is positioned between two nodes of the network and is hidden from the telecommunication network devices connected to the network.

At 406, the system can generate a profile for each active telecommunication network device at the location. In one example, the profile includes the standard activity level for an active telecommunication network device. The profile is unique to each active telecommunication network device and the profile includes activity over a predetermined time period. At 408, the system can record data of each profile on a blockchain. In one example, the blockchain is updated based on an update to the profile. In one example, the system can update the profile for each active telecommunication network device at the location, where the profile is updated after a predetermined time period has occurred. The system can record the updated profile on the blockchain.

At 410, the system can monitor a network for deviations from the standard activity level. In one example, a deviation from the standard activity level is caused by unexpected activity on the network at the location. At 412, the system can detect, using a network traffic object profiler, the unexpected activity at the location. In one example, the unexpected activity includes an unexpected network traffic amount, an unexpected network traffic type, or an unexpected power consumption amount. At 414, the system can compare the unexpected activity to the standard activity level recorded on the blockchain.

At 416, the system can determine a source of the unexpected activity based on the source's Internet Protocol (IP) address and the comparison of the unexpected activity level to the standard activity level. In one example, the source of the unexpected activity is a decommissioned telecommunication network device. In another example, the system can determine that the unexpected activity is of a network traffic type different from the network traffic type expected to be performed by the source. The system can quarantine the source of the unexpected activity based on the determination that the unexpected activity is of a type different from the type typically generated by the source. In another example, to determine the source of the unexpected activity, the system can receive, over the network, a list of decommissioned telecommunication network devices at a location. The list of decommissioned telecommunication network devices includes the predetermined decommissioning procedure applied to the telecommunication network device. The predetermined decommissioning procedure includes a decommissioning date, a last security update date, or the IP address for each decommissioned telecommunication network device.

At 418, the system can determine a list of security vulnerabilities caused by the decommissioned telecommunication network device having an active status on the network. At 420, the system can execute, based on the list of security vulnerabilities, a predetermined decommissioning procedure on the source of the unexpected activity. In one example, executing the predetermined decommissioning procedure causes the source of the unexpected activity to be deactivated and disconnected from the network. In one example, the system can determine a list of active telecommunication network devices for multiple locations. The system can measure, using multiple software agents, a standard activity level for each of the active telecommunication network devices for each of the multiple locations. Each of the multiple locations has a different software agent. The system can generate a location profile for each of the multiple locations. The location profile includes the standard activity level for each active telecommunication network device at the location and a total activity level at the location. The system can record each location profile on the blockchain. Each of the multiple locations has a different blockchain.

Computer System

Figure 5:
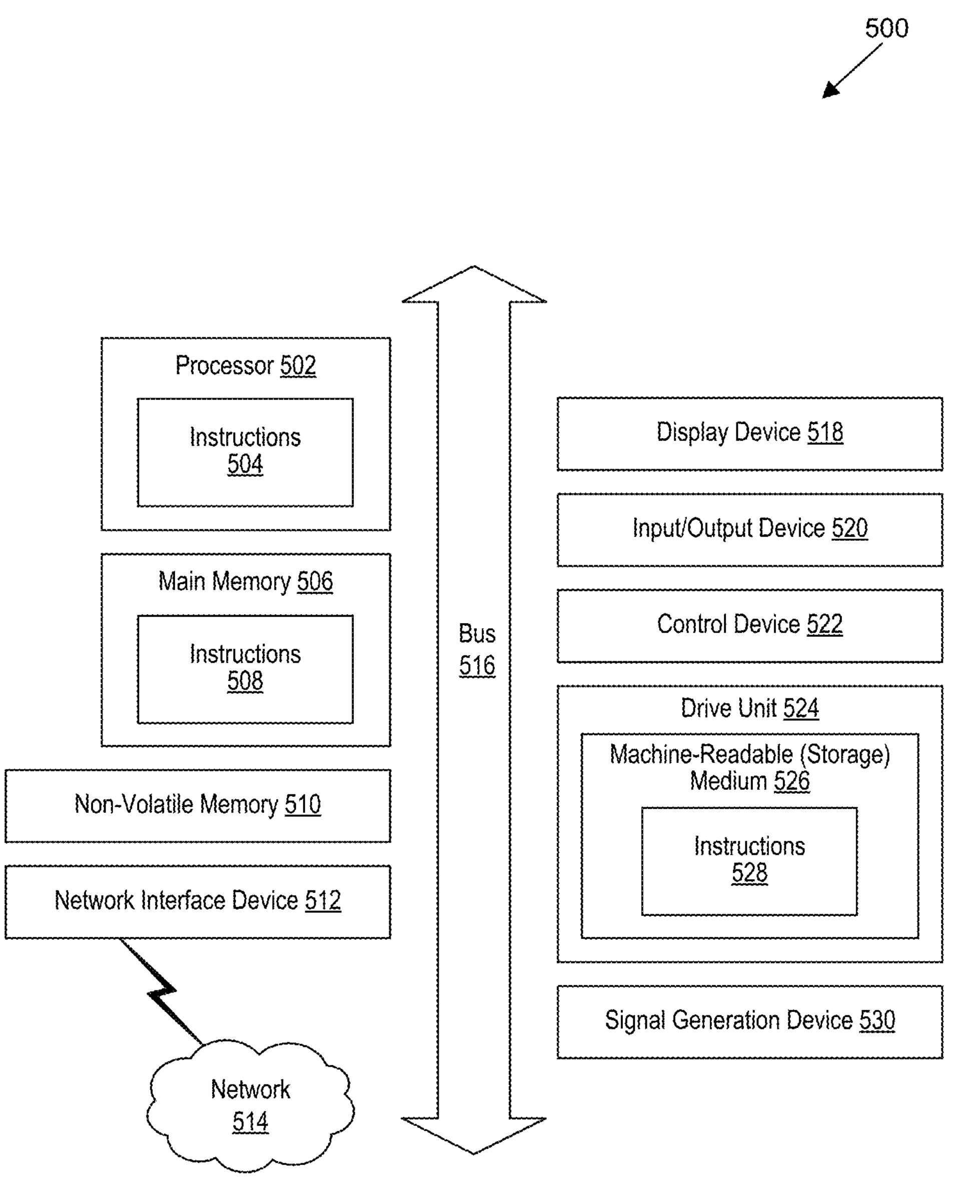
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system comprising:

at least one hardware processor; and at least one non-transitory memory storing instructions, which, when executed by the at least one hardware processor, cause the system to:

determine a list of active telecommunication network devices at a location, wherein a status for a telecommunication network device is active or decommissioned;

measure a standard activity level for each active telecommunication network device at the location, wherein the standard activity level includes a network traffic amount, a network traffic type, or a power consumption amount;

generate a profile for each active telecommunication network device at the location, wherein the profile includes the standard activity level for an active telecommunication network device;

record data of each profile on a blockchain, wherein the blockchain is updated based on an update to the profile;

detect, using a network traffic object profiler, unexpected activity at the location, wherein the unexpected activity includes an unexpected network traffic amount, an unexpected network traffic type, or an unexpected power consumption amount;

determine that a source of the unexpected activity is a decommissioned telecommunication network device based on an Internet Protocol (IP) address of the source and a comparison of the unexpected activity level to the standard activity level recorded on the blockchain;

determine a list of security vulnerabilities caused by the decommissioned telecommunication network device having an active status on the network; and execute, based on the list of security vulnerabilities, a predetermined decommissioning procedure on the source of the unexpected activity.

2. The system of claim 1 further caused to:

determine that the unexpected activity is of a network traffic type different from the network traffic type typically generated by the source; and quarantine the source of the unexpected activity based on the determination that the unexpected activity is of a type different from the type typically generated by the source.

3. The system of claim 1, wherein a software agent is positioned between two nodes of the network and is hidden from the telecommunication network devices connected to the network.

4. The system of claim 1, wherein executing the predetermined decommissioning procedure causes the source of the unexpected activity to be deactivated and disconnected from the network.

5. The system of claim 1 further caused to:

update the profile for each active telecommunication network device at the location, wherein the profile is updated after a predetermined time period has occurred; and record the updated profile on the blockchain.

6. The system of claim 1, wherein to determine the source of the unexpected activity, the system is further caused to:

receive, over the network, a list of decommissioned telecommunication network devices at the location, wherein the list of decommissioned telecommunication network devices includes the predetermined decommissioning procedure applied to the telecommunication network device, and wherein the predetermined decommissioning procedure includes a decommissioning date, a last security update date, or the IP address for each decommissioned telecommunication network device.

7. The system of claim 1 further caused to:

determine a list of active telecommunication network devices for multiple locations;

measure, using multiple software agents, a standard activity level for each of the active telecommunication network devices for each of the multiple locations, wherein each of the multiple locations has a different software agent;

generate a location profile for each of the multiple locations, wherein the location profile includes the standard activity level for each active telecommunication network device at the location and a total activity level at the location; and record each location profile on the blockchain, wherein each of the multiple locations has a different blockchain.

8. A non-transitory, computer-readable storage medium comprising instructions recorded thereon, wherein the instructions, when executed by at least one data processor of a system, cause the system to:

determine a list of active telecommunication network devices at a location, wherein a status for a telecommunication network device is active or decommissioned;

generate a profile for each active telecommunication network device at the location, wherein the profile includes a standard activity level for an active telecommunication network device;

record data of each profile on a blockchain, wherein the blockchain is updated based on an update to the profile;

detect, using a network traffic object profiler, unexpected activity at the location, wherein the unexpected activity includes an unexpected network traffic amount, an unexpected network traffic type, or an unexpected power consumption amount;

compare the unexpected activity to the standard activity level recorded on the blockchain;

determine that a source of the unexpected activity is a decommissioned telecommunication network device based on an Internet Protocol (IP) address of the source and a comparison of the unexpected activity level to the standard activity level;

determine a list of security vulnerabilities caused by the decommissioned telecommunication network device having an active status on the network; and execute, based on the list of security vulnerabilities, a predetermined decommissioning procedure on the source of the unexpected activity.

9. The non-transitory, computer-readable storage medium of claim 8 further caused to:

determine that the unexpected activity is of a network traffic type different from the network traffic type typically generated by the source; and quarantine the source of the unexpected activity based on the determination that the unexpected activity is of a type different from the type typically generated by the source.

10. The non-transitory, computer-readable storage medium of claim 8, wherein a software agent is positioned between two nodes of the network and is hidden from the telecommunication network devices connected to the network.

11. The non-transitory, computer-readable storage medium of claim 8, wherein executing the predetermined decommissioning procedure causes the source of the unexpected activity to be deactivated and disconnected from the network.

12. The system of claim 8 further caused to:

update the profile for each active telecommunication network device at the location, wherein the profile is updated after a predetermined time period has occurred; and record the updated profile on the blockchain.

13. The non-transitory, computer-readable storage medium of claim 8, wherein to determine the source of the unexpected activity, the system is further caused to:

receive, over the network, a list of decommissioned telecommunication network devices at the location, wherein the list of decommissioned telecommunication network devices includes the predetermined decommissioning procedure applied to the telecommunication network device, and wherein the predetermined decommissioning procedure includes a decommissioning date, a last security update date, or the IP address for each decommissioned telecommunication network device.

14. The non-transitory, computer-readable storage medium of claim 8 further caused to:

determine a list of active telecommunication network devices for multiple locations;

measure, using multiple software agents, a standard activity level for each of the active telecommunication network devices for each of the multiple locations, wherein each of the multiple locations has a different software agent;

generate a location profile for each of the multiple locations, wherein the location profile includes the standard activity level for each active telecommunication network device at the location and a total activity level at the location; and record each location profile on the blockchain, wherein each of the multiple locations has a different blockchain.

15. A method comprising:

determining a list of active telecommunication network devices at a location, wherein a status for a telecommunication network device is active or decommissioned;

generating a profile for each active telecommunication network device at the location, wherein the profile includes a standard activity level for an active telecommunication network device;

recording data of each profile on a blockchain, wherein the blockchain is updated based on an update to the profile;

detecting unexpected activity at the location, wherein the unexpected activity includes an unexpected network traffic amount, an unexpected network traffic type, or an unexpected power consumption amount;

determining a source of the unexpected activity based on an Internet Protocol (IP) address of the source and a comparison of the unexpected activity level to the standard activity level, wherein the source of the unexpected activity is a decommissioned telecommunication network device;

determining a list of security vulnerabilities caused by the decommissioned telecommunication network device having an active status on the network; and executing, based on the list of security vulnerabilities, a predetermined decommissioning procedure on the source of the unexpected activity.

16. The method of claim 15 further comprising:

determining that the unexpected activity is of a network traffic type different from the network traffic type typically generated by the source; and quarantining the source of the unexpected activity based on the determination that the unexpected activity is of a type different from the type typically generated by the source.

17. The method of claim 15, wherein executing the predetermined decommissioning procedure causes the source of the unexpected activity to be deactivated and disconnected from the network.

18. The method of claim 15 further comprising:

updating the profile for each active telecommunication network device at the location, wherein the profile is updated after a predetermined time period has occurred; and recording the updated profile on the blockchain.

19. The method of claim 15, wherein to determine the source of the unexpected activity, the method further comprising:

receiving, over the network, a list of decommissioned telecommunication network devices at the location, wherein the list of decommissioned telecommunication network devices includes the predetermined decommissioning procedure applied to the telecommunication network device, and wherein the predetermined decommissioning procedure includes a decommissioning date, a last security update date, or the IP address for each decommissioned telecommunication network device.

20. The method of claim 15 further comprising:

determining a list of active telecommunication network devices for multiple locations;

measuring, using multiple software agents, a standard activity level for each of the active telecommunication network devices for each of the multiple locations, wherein each of the multiple locations has a different software agent;

generating a location profile for each of the multiple locations, wherein the location profile includes the standard activity level for each active telecommunication network device at the location and a total activity level at the location; and recording each location profile on the blockchain, wherein each of the multiple locations has a different blockchain.

* * * * *